United States Patent [19]
Fritzvold et al.
[11] 4,139,467
[45] Feb. 13, 1979

[54] DISC PRESS FOR CONTINUOUS PRESSING OF AQUEOUS OR SUSPENDED PULP

[75] Inventors: Björn H. Fritzvold, Hosle; Arne Lynghjem, Oslo; Oystein Johnsen, Oslo; Leif H. Eriksen, Oslo, all of Norway

[73] Assignee: Myrens Verksted A/S, Oslo, Norway

[21] Appl. No.: 878,771

[22] Filed: Feb. 17, 1978

[30] Foreign Application Priority Data

Feb. 18, 1977 [NO] Norway ................................ 770554

[51] Int. Cl.[2] ...................... B01D 25/12; B01D 25/14; B01D 25/38; B01D 33/26

[52] U.S. Cl. ...................................... 210/97; 210/107; 210/225; 210/351; 210/359; 210/393; 210/394; 210/397; 100/116; 100/158 C

[58] Field of Search ................. 210/97, 107, 224, 384, 210/386, 331, 346, 359, 393, 394, 225, 230, 87, 90, 137, 350, 351, 397; 100/37, 116, 121, 158; 162/396

[56] References Cited

U.S. PATENT DOCUMENTS

| | | | |
|---|---|---|---|
| 390,651 | 10/1888 | Crawford | 100/121 |
| 3,467,003 | 9/1969 | Schmid | 100/116 |
| 3,739,914 | 6/1973 | Moatti | 210/333 |
| 3,820,452 | 6/1974 | Eriksson et al. | 100/37 |
| 3,948,165 | 4/1976 | Seifert | 100/116 |

FOREIGN PATENT DOCUMENTS

| | | | |
|---|---|---|---|
| 1,028,091 | 4/1958 | Fed. Rep. of Germany | 210/350 |

*Primary Examiner*—Charles N. Hart
*Assistant Examiner*—David R. Sadowski
*Attorney, Agent, or Firm*—Holman & Stern

[57] ABSTRACT

A disc press for continuous pressing of aqueous or suspended pulp for fractionating the pulp in a liquid fraction and a dry substance fraction, comprises two plane parallel pressing discs mounted for rotation about a shaft and having strainer plates which haul the pulp therebetween by friction. The press also comprises inner and outer pressing means extending between the pressing discs and together with the latter define a curved pulp passage which in the transport direction has a varying cross section and constitutes a filling or dewatering zone, a pressing zone and a discharge zone. The passage zones of the pulp passage combined extend throughout an angle which is less than 360°, and the filling or dewatering zone has an approximately constant cross section. The subsequent pressing zone (B) has a uniformly decreasing cross section, the centerline of the pressing zone following an arc having an approximately constant radius about the axis of rotation. The pressing zone of the pulp passage has an outer confining surface which is shaped as pivoted arm having a curved concave surface, the arm at its one end being mounted for swinging about a point at the start of the pressing zone and at its other end being connected to a power means in the form of an adjustable hydraulic cylinder which holds the arm with a predetermined force, and which when the pulp pressure in the press exceeds a predetermined value, will influence and displace the pivoted arm.

11 Claims, 3 Drawing Figures

1
2
3
4
5
9
10
11
12
13
14
15
16
17
21
22
22
29
30
A
B
C
R1

DISC PRESS FOR CONTINUOUS PRESSING OF AQUEOUS OR SUSPENDED PULP

BACKGROUND OF THE INVENTION

The present invention relates to a disc press for continuous pressing of aqueous or suspended pulp for fractionating the pulp into a liquid fraction and a dry substance fraction, comprising two rotatable plane parallel pressing discs including strainer plates which haul the pulp therebetween by friction, and inner and outer pressing means extending between the pressing discs and together with the pressing discs defining a curved pulp passage which in the transport direction has a varying cross section and is constituted by a filling or dewatering zone, a pressing zone and a discharge zone.

DESCRIPTION OF PRIOR ART

In industry there are known methods and presses which at an appropriate stage of a working process are used to concentrate pulps of various kinds. Such pulp may for example be mechanical wood pulp, chemical pulp, semi-chemical pulp, waste pulp, fish pulp or other pulps which appear in the pulp and paper, food or metallurgical industry.

Presses of the kind used for concentrating pulps may for example be of the screw press or the disc press type. However, screw presses are often difficult to regulate, and disc presses, in turn, suffer from the disadvantage that a blockage may easily develop in the inlet of the press.

From NO-PS 85 967 (US-PS 910 967) there is known a disc press consisting of two plane parallel strainer plates rotating in mutual synchronism on either side of a stationary, spiral-shaped pressing body. During the pressing operation the pulp is driven by friction against the strainer plates through the spiral-shaped pressing body, the body together with the strainer plates defining a spiral-shaped passage having a cross section which decreases in the transport direction.

However, the press according to the above-mentioned patent specifications is suitable only for pulp types where a low pressing pressure is sufficient for achieving the desired concentration. This is so because the pulp has a long transport path through the press, and because the feeding of the press takes place axially at the center of the press, a fact which amplifies the possibility of developing blockades in the pulp passage when the pulp is pressed through the spiral-shaped passage towards an outlet opening at the periphery of the press. Further, this known press requires an elaborate work during dismantling, and maintenance is very time-consuming and complicated.

SUMMARY OF THE INVENTION

The object of the present invention is to give directions for a disc press which better counteracts the disadvantages discussed above. In other words the invention provides for a disc press which is controlled and regulated more easily, the risk of pulp blockage in the press being minimized.

According to the invention, in a disc press of the type stated in the preamble the above objects are achieved due to the fact (a) that the passage zones of the pulp passage combined extend throughout an angle less than 360°, (b) that the filling or dewatering zone has an approximately constant cross section, (c) that the subsequent pressing zone has a uniformly decreasing cross section, the centerline of the pressing zone following a curve having approximately constant radius about the rotating shaft, (d) that the pressing zone of the pulp passage has an outer confining surface which is shaped as a pivoted arm having a curved concave surface, the pivoted arm at its one end being mounted for swinging about a point at the start of the pressing zone and at its other end being connected to a power means in the form of an adjustable hydraulic cylinder which holds the arm with a predetermined value, will influence and displace the pivoted arm.

By the press according to the invention the pressing of aqueous or suspended pulp may take place with minimum relative movement between the pulp and the strainer plates and between the pulp and the other parts which constitute the pressing passage, a fact which is very favourable inter alia for avoiding the forming of knots in mechanical pulps. Because the centerline of the pressing passage follows a circular arc both in the filling zone and in the pressing zone, the pulp string will be passed through the press with an approximately constant average speed.

To subject the pulp string in the pressing zone to a pressure which is adapted to the consistency and the dewatering qualities of the pulp, one of the pressing means in the disc press will according to the present invention be formed as a pivotable arm having a curved concave surface which formes part of the pressing zone of the pulp passage.

At one end the pivoted arm is mounted for turning about a point at the beginning of the pressing zone, and at its other end the arm is connected to a hydraulic cylinder which imparts a predetermined and constant pressure to the pulp string in the press. The predetermined pressure of the cylinder is set at a value which depends on the dewatering qualities of the pulp, and the cylinder is adapted so as to yield when a counterpressure from the mass exceeds the preset pressure, for thereby reducing the counterpressure from the pulp.

Thereby is achieved a safeguard which effectively counteracts a blockage of the pulp in the pressing zone of the press, and hence unnecessary shut-down or in worst case machinery damage is counteracted. If a blockage develops in the press and thereby an increased pressure in the pressing zone, the pivotable arm which constitutes the outer confining surface of the pressing zone, will yield and open the press, the pressing force from the cylinder then being insufficient to balance the pressure of the pulp against the arm.

Another favourable feature of the present invention consists in the fact that one of the pressing discs is mounted on a drive shaft adapted to be axially displaced in the second pressing disc, and that during normal operation the pressing discs are maintained at a proper mutual disc distance by a hydraulic cylinder which is located within the shaft, and which is slidably mounted on a piston having a piston head.

During operation the pressing discs are kept together at a proper mutual distance by the hydraulic cylinder within the shaft, the cylinder affording a constant holding force. When the press is in use the pressing pressure will cause the pressing discs and the shaft to be subjected to stretches and small deformations, but these are compensated for by the hydraulic cylinder.

With axially displaceable pressing discs there is achieved a disc press which is easy to maintain, overhaul and clean. The pressing discs with the strainer plates can be dismantled automatically by the hydraulic cylinder, one or both discs being detachable and displaceable on the central through-going shaft. Further, such an automatic displacement of the pressing discs and the strainer plates on the rotating shaft will be advantageous if a blockage should develop for example in the inlet zone of the press, i.e. in the area in which the curved pivotable arm has not yet come into effect. The blockage in the inlet zone of the press will then either be entrained by the pressing discs since the complete inlet zone has the same passage cross section, or the controllable hydraulic cylinder may be actuated due to too large axial load on the discs, so that the discs are moved apart along the shaft and thereby alter the cross section of the inlet zone.

Thereby, in addition to the safeguard means constituted by the pivotable arm, there is achieved a further safeguard means which ensures that the pulp cannot block the press.

Routine cleaning of disc presses is of the greatest importance for meeting the requirements of hygiene in connection with the treatment of pulp in the food industry, for example fish pulp. However, the cleaning of the strainer is to be considered for all types of pulp, but especially for antiseptic manufacture the direct access to all pulp contacted parts for cleaning and visual inspection thereof is of the greatest importance. By the present invention the strainer plates can by means of some simple manual operations be dismantled from the pressing discs, since the strainer plates are screwed to the pressing discs along the periphery, and the access to the pressing discs is made very simple by the controlled hydraulic cylinder arranged within the drive shaft.

However, the disc press according to the present invention is also designed with a view to continuous cleaning during operation. Thus, in the present disc press, in a second pressing means arranged between the filling zone and the discharge zone of the pulp passage, there is provided a slit which allows for the access of a scavenging pipe for fluid for cleaning the strainer surfaces. By such means the press may be cleaned continuously during operation, the slit serving as an inspection opening for parts of the strainer surfaces.

It is to be understood that the disc press according to the present invention will work most efficiently if the pulp to be pressed is pumped into the disc press with an adjustable overpressure. Thus, the press may conveniently be connectd to a feed pump of the type which is disclosed in Norwegian Patent Application No. 74 2174 (laid open for public inspection under No. 137.655), the pump being driven by a hydraulic motor which is connected to a controllable pressure unit. This allows for simple regulation of the speed of the pump for controlling the infeed pressure to the press.

Thus the present invention provides a disc press which can easily be regulated, its design and connection to process apparatus ahead of it affording several degrees of freedom. These relate to regulation of the flow cross section of the press passage, i.e. the compression ratio by altering the position of the pressing arm, regulation of the pressure in the press by means of the force in the hydraulic cylinder connected to the pressing arm, to regulation of the infeed pressure by a feed pump connected in front of the press and having controllable pressure and feeding rate, as well as to regulation of the speed of the press.

BRIEF DESCRIPTION OF THE DRAWINGS

In the following the invention will be further described, reference being had to the drawing which shows a preferred embodiment of the disc press according to the invention.

DESCRIPTION OF THE PREFERRED EMBODIMENTS

Figure 1:
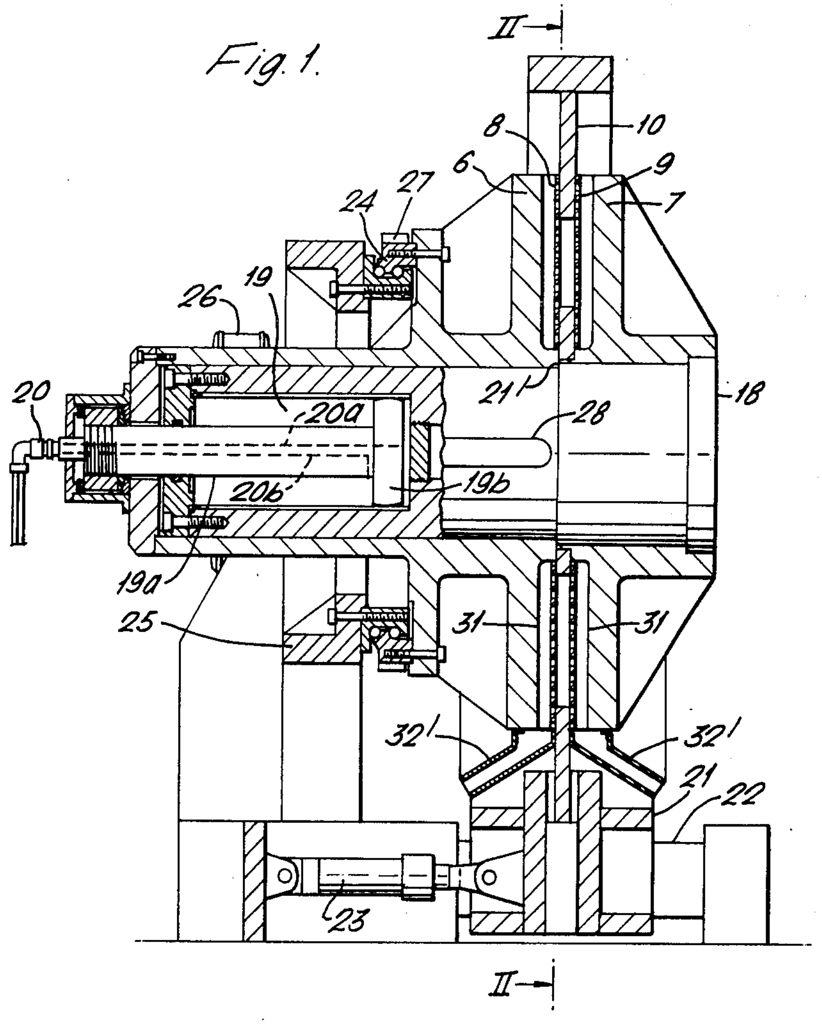
FIG. 1 shows a section through a preferred embodiment of the disc press according to the invention.
Figure 2:
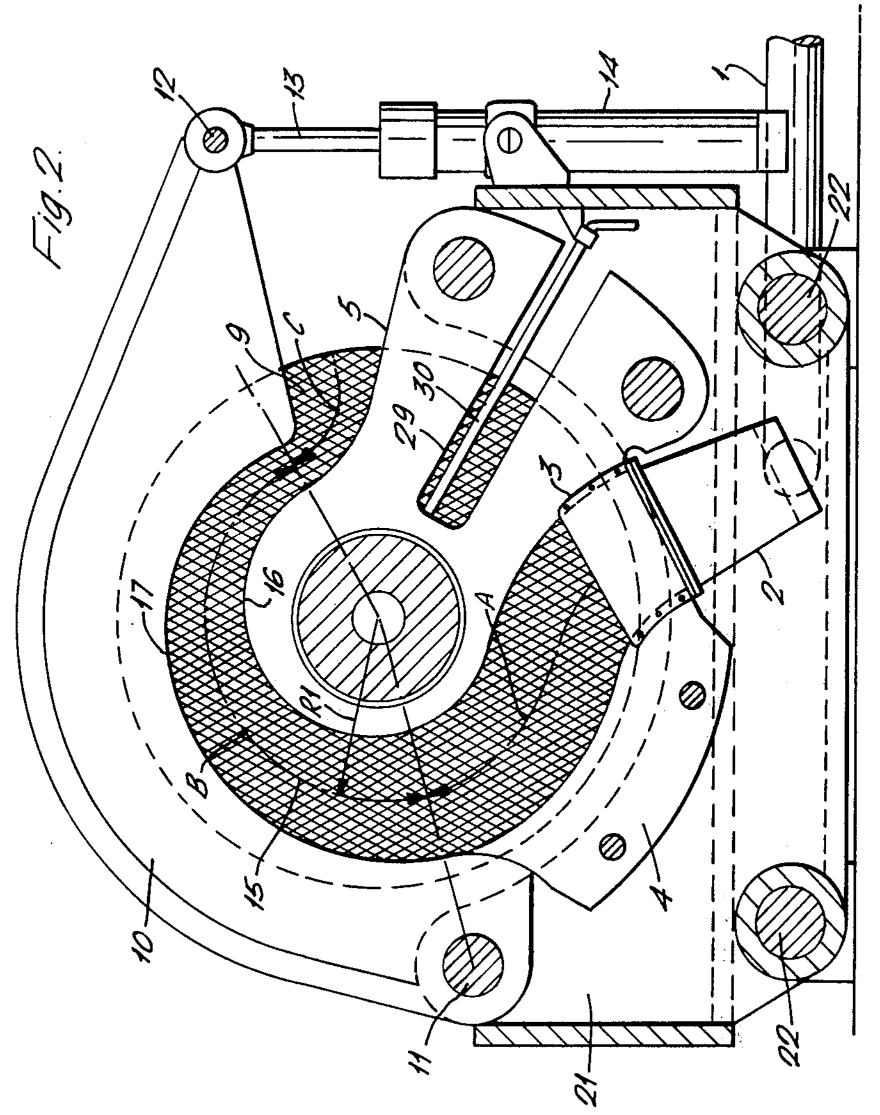
FIG. 2 shows a section taken along the line II—II in FIG. 1.

The disc press illustrated in the drawing comprises a supply conduit 1 which via suitable pipe bends not illustrated, are connected to an inlet connecting piece 2 and two thin inlet plates 3 opening into a filling or dewatering zone A which is confined by an outer stationary pressing means 4 and an inner stationary pressing means 5, as well as two perforated pressing discs 6 and 7 having inwardly facing strainer plates 8, 9. The dewatering zone A has an approximately constant cross section and merges into a pressing zone B which besides from being confined by the pressing discs 6, 7 with the strainer plates 8, 9 and the stationary pressing means 5, is also confined by a pivotable, curved arm 10. At its one end where the dewatering zone A merges into the pressing zone B, the arm 10 is pivotably mounted on a shaft 11, and at its other end it is connected through a pivot 12 to the piston rod 13 of a hydraulic cylinder 14 affording a preset, constant force.

The pivotable arm 10 and the stationary inner pressing means 5 are so shaped relative to each other that the pressing zone B will have a uniformly decreasing cross section, the centerline 15 of the pressing zone following an arc having an approximately constant curvature, preferably a part of a circle having a radius $R_1$ about the rotation shaft.

In the area of the pressing zone B the pressing means 5 has a curved surface 16 defining a spiral curve with a curvature which decreases in the transport direction. The inner concave surface 17 of the curved arm 10 follows a spiral curve which in the transport direction has an increasing curvature. The curvature of the two surfaces 16 and 17 decreases respectively increases at same rate in the transport direction.

The pressing zone B having a uniformly decreasing cross section in the transport direction merges into an outlet zone C having an increasing cross section and a comparatively large final cross section as compared to the most narrow cross section of the pressing zone B. The filling zone A, the pressing zone B and the discharge zone C constitute together a pulp passage with varying cross section and cover an angle less than 360°, the inner, stationary pressing means 5 lying in the same radial plane as the filling zone A and the discharge zone C and separating these from each other.

One of the pressing discs 7 is shrinked on a shaft 18 which is adapted for axial displacement in the other pressing disc 6. During normal operation the pressing discs 6 and 7 are maintained at a correct disc distance by a cylinder 19 which is provided within the shaft 18, and which houses a piston **19*a* having a piston head 19*b*. Via a swivel connection 20 and bores 20*a*, 20*b* in the piston 19*a* the cylinder 19** is supplied with oil under pressure.

Figure 3:
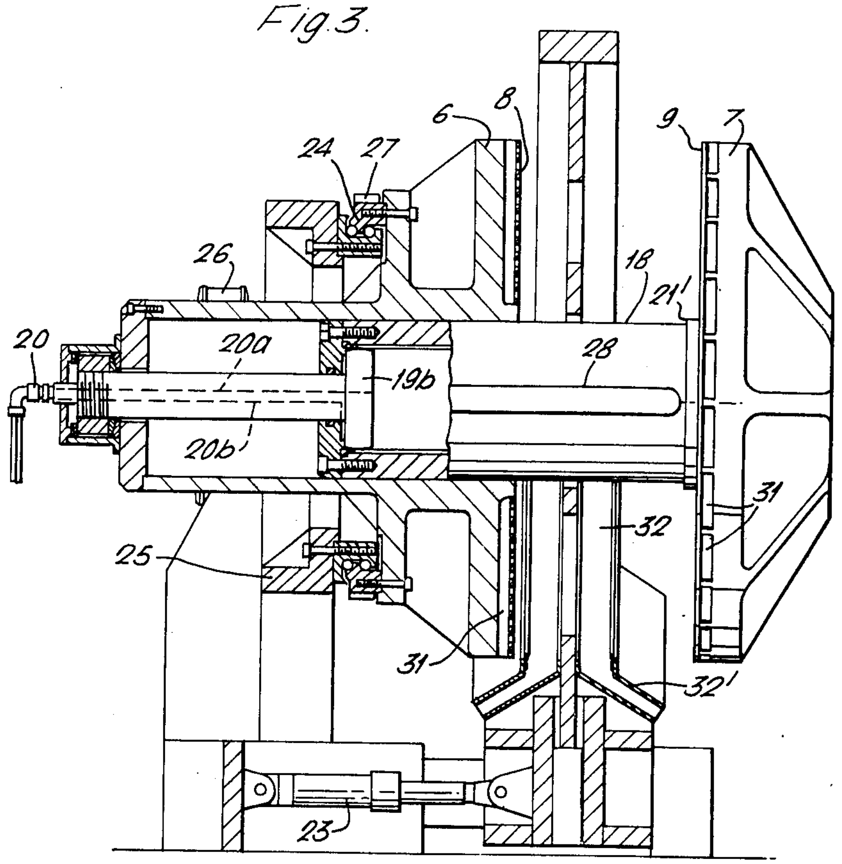
FIG. 3 is a view, partially in section, similar to FIG. 1, in which the pressing discs with the strainer surfaces are shown displaced from each other.

When oil under pressure is supplied through the bore **20*b*, the shaft 18 is pressed to the left until against a shoulder 21' on the shaft 18 it will bear against the boss of the pressing disc 6. When oil under pressure is supplied to the cylinder 19 through the bore 20*a*, the pressing disc 7 will be displaced axially away from the pressing disc 6, as this is best illustrated in FIG. 3. The stationary parts which are constituted by the inlet connection piece 2 and the thin inlet plates 3, the outer pressing means 4 and the inner pressing means 5, the pivoted arm 10 and the cylinder 14 as well as a mounting member 21 for the arm 10, are displaceably mounted on two guiding shafts 22 by a hydraulic jack 23. In addition to the one pressing disc 7** also the above enumerated stationary parts are shown displaced to the right in FIG. 3.

The pressing disc 6 is mounted in a rim gear bearing 24 attached to a base 25. The press is driven by two hydraulic motors 26 which are mounted on the base 25, and which operate a toothed rim 27 rigidly connected to the pressing disc 6. During operation the rotational motion of the pressing disc 6 is transmitted to the shaft 18 and thereby to the pressing disc 7 via a key connection 28.

The inner pressing means 5 which is mounted on the mounting member 21 is provided with a recess or slit 29 in which there is passed a flashing pipe 30 for the supply of fluid, so that a continuous cleaning of the strainer surfaces 8, 9 can be carried out during operation of the press.

In the pressing discs 6, 7 facing the strainer surfaces 8, 9, there are provided radial passages 31 serving as outlets for the liquid which is pressed out from the material being worked in the press. When the pressing discs are in the position illustrated in FIG. 1, the contents of the passage 31 are emptied into discharge funnels 32 provided on the mounting member 21 and surrounding the lower half of the circumference of the discs and having inclined outlet passages 32' at their lower end.

The pressing process is started up by pumping into the press a pulp having a given water content and particular dewatering properties, by an appropriate pressure pulp pump, for example a centrifugal pump, a displacement pump, an excenter screw pump or a usual feed screw. The pulp is thus fed into the filling or dewatering zone A of the press with an adjustable overpressure and is here dewatered under pressure by being pressed against the stationary pressing means 4, 5 and the rotatable strainer plates 8, 9. From the dewatering zone A the pulp is passed on by the perforated strainer plates 8, 9 with the same speed as these into the following pressing zone B, in which the actual pressing operation takes place. In the pressing zone B the inner and outer confining surfaces of the pressing passage define, as mentioned, two spiral curves, the distance between the one spiral curve and the center decreasing as a function of the angle of rotation, whereas the distance between the other spiral curve and the center increases to the same extent, so that a passage is formed which has a uniformly decreasing cross section which opens into a press nip. Both in the dewatering zone A and in the subsequent pressing zone B the center line of the pulp string follows a circular arc, a fact which contributes in keeping the slip between the strainer surfaces and the pulp string at a minimum, which is very favourable for avoiding the formation of knots in wood pulp.

Since the pressing operation is included as a stage in a more extensive process for treating aqueous or suspended pulps, it is of great importance to keep the production and the contents of dry substance of the pulp at process optimal, preferably constant values, independent of the type of pulp. The relation between the variables involved in such a treating process can be expressed as:

$$Q = f_1 (Pp, h, n,)$$

$$g = f_2 (Pp, Ph, n)$$

In the first expression Q is a measure for the production capacity or the rate of flow per unit of time, and as it can be seen, this is a function of the pump pressure $Pp$, the size $h$ of the press nip or outlet opening and the rotational speed n of the press. In the second expresion $g$ denotes the contents of a dry substance or the concentration of the treated material, and this quantity is a function of the pump pressure $Pp$, the pressure $Ph$ of the hydraulic cylinder and the dewatering speed or the rotational speed n of the press. The functions $f_1$ and $f_2$ will be different, depending on the various pulp types and their dewatering characteristics. Further, the internal friction of the pulp, i.e. the ability of the pulp to absorb shearing forces, can be described as a function of the dry substance content.

With the press disclosed above it is possible by simple means to carry out such regulations which keep the rate Q of volume flow per time unit and the dry substance content g approximately constant, a manual or automatic regulation being carried out in the presence press which sets the secondary variable parameters on values causing the desired results to be achieved.

In the press described above, alterations of production parameters which make the production capacity and the dry substance content independent of the pulp type and the particular dewatering qualities thereof can be carried out in four different ways. These ways are as follows:

(a) A change in the position of the pivotable arm 10 entails a change in the flow cross section of the pressing passage (compression ratio).

(b) With the cylinder 14 the pressing force of the arm 10 may be set at a predetermined value.

(c) By regulating the speed of the press the desired production capacity can be achieved.

(d) By regulating the infeed pressure by a feeding pump connected in front and having adjustable pressure and rate of flow.

In addition to exhibiting advantages in the regulating technique the invention also entails the additional advantage that only minimum relative motion between the pulp and the strainer plates will occur during the pressing operation. The shape of the pressing passage, i.e. a passage having a centerline which approximately follows a circle additionally gives the pulp string an approximately constant average speed through the press.

A third advantage of the invention is that the risk for the pulp to block the press and thereby cause shut-down or in worst case machinery damage, is minimized. If a blockage and hence an overpressure should occur in the pressing zone B, the pivoted arm which constitutes the outer confining surface of the pressing zone, will yield and open the press. If a blockage should develop in the filling zone A of the press, the blockage will either be entrained by the pressing discs since the complete inlet zone has the same passage cross section, or the cylinder 19 within the drive shaft 18 will allow the discs to be pressed apart due to the increased axial load thereagainst.

A fourth advantage of the disc press according to the invention is that it is easy to maintain, inspect and clean. The pressing discs with the strainer plates can be dismantled automatically by the hydraulically controlled means, one of the discs being detachable and displacable together with or along the central, through-going shaft. The stationary parts between the discs can also in a simple manner be displaced and possibly detached. The pressing discs can also, for example when replacing the strainer plates, be easily detached completely from the rotating shaft.

A further advantage of the press according to the invention is that it can be cleaned continuously during operation, a supply pipe for a suitable scavenging liquid being provided in the recess of the stationary inner pressing part.

Finally, the disc press according to the invention exhibits the advantage of occupying little space.

It is to be understood that the disc press disclosed can be designed in other ways than the one described above without departing from the scope of the invention.

For example, one of the pressing discs may be mounted on a drive shaft which is adapted for axial displacement in the other pressing disc, the drive shaft with the one pressing disc being attached to a cylinder rod extending through the shaft. The cylinder rod can then at its one end be provided with fixing means for attachment to the shaft and at its other end be provided with a piston head displaceably arranged in a pressure cylinder.

Further, the mounting of the pressing discs may be carried out in a different way from that in which only one of the discs is mounted on a rim gear bearing. In connection with pulp types which are easy to dewater and therefore causes a minor load on the press, the pressing discs may be arranged without a central through-going shaft, the pressing discs then being mounted in their own rim gear bearing. The infeed to the press may then take place at the center, the pressing discs here being provided with openings allowing for such supply. If desired, one or both pressing discs 6, 7 with strainer plates 8, 9 may be detachably mounted on a through-going, rotating shaft by a hydraulic or mechanical locking device. The pressing discs 8, 9 can then be connected to a hydraulic cylinder serving to move the discs apart along the shaft when the locking device is open.

What we claim is:

1. Disc press for continuous pressing of aqueous or suspended pulp for fractionating the pulp in a fluid fraction and a dry substance fraction, comprising two plane parallel pressing discs having strainer plates which are rotatably mounted on a shaft and which haul the mass therebetween by friction, and inner and outer pressing means extending between the strainer plates and together with the latter defining a curved pulp passage which in the transport direction has a varying cross section and is constituted by a filling or dewatering zone, a pressing zone and a discharge zone, characterized in (a) that the passage zones (A, B, C) of the pulp passage combined extend throughout an angle less than 360°, (b) that the filling or dewatering zone (A) has an approximately constant cross section, (c) that the subsequent pressing zone (B) has a uniformly decreasing cross section, the centerline (15) of the pressing zone following a curve having approximately constant radius ($R_1$) about the rotating shaft, (d) that the pressing zone (B) of the pulp passage has an outer confining surface which is shaped as a pivoted arm (10) having a curved concave surface (17), the pivoted arm (10) at its one end being mounted for swinging about a point (11) at the start of the pressing zone (B) and at its other end being connected to a power means in the form of an adjustable hydraulic cylinder (14) which holds the arm (10) with a predetermined force and which when the pulp pressure in the press exceeds a predetermined value, will influence and displace the pivoted arm (10).

2. Press as specified in claim 1, characterized in that the holding force of the cylinder (14) holding the arm (10) is regulated relative to the dewatering properties of the pulp, the cylinder (14) being adapted so as to yield and thereby reducing the counterpressure from the pulp when this counterpressure from the pulp exceeds a predetermined value.

3. Press as specified in claim 1 or 2, characterized in that the curved surface (17) of the arm defines a first spiral path having an increasing curvature in the transport direction.

4. Press as specified in claim 1, characterized in that the inner pressing means is shaped as a stationary intermediate part (5) having a curved surface (16) which constitutes a confinement of the pulp passage.

5. Press as specified in claim 4, characterized in that the curved surface (16) of the inner pressing means (5) in the pressing zone (B) defines a second spiral curve having a decreasing curvature in the transport direction.

6. Press as specified in claim 3 characterized in that the curvatures of the first and secnd spiral paths increases respectively decreases at the same rate in the transport direction.

7. Press as specified in claim 4, characterized in that in the inner pressing means (5) which separates the filling zone (A) and the discharge zone (C) there is provided a slit (29) which allows for the access of a scavenging pipe (30) for fluid for cleaning the strainer surfaces (8, 9).

8. Press as specified in claim 1, characterized in that one of the pressing discs (7) is mounted on a drive shaft (18) adapted for axial displacement in the second disc (6), and that during normal operation the pressing discs (6, 7) are maintained at a proper mutual disc distance by an hydraulic cylinder (19) which is provided within the shaft (18), and which is slidingly mounted on a piston (19*a*) having a piston head (19*b*).

9. Press as specified in claim 8, characterized in that one of the pressing discs (6) is mounted in a rim gear bearing (24), a driven gear rim (27) being mounted on the one pressing disc (6) for operation of the press.

10. Press as specified in claim 1, characterized in that the inner and outer pressing means (4, 5, 10) are detachably mounted on a mounting member (21) for axial displacement when the press discs (6, 7) are pushed apart.

11. The press as specified in claim 1, characterized in that the pressing discs (6, 7) are kept at a proper mutual distance by a second hydraulic cylinder (19) which acts as an additional safeguard by opening the complete pulp passage (A, B, C) when the pressure in the press exceeds a given threshold valve.

* * * * *